United States Patent Office 3,518,255
Patented June 30, 1970

3,518,255
ACETALIC ETHERS OF ESTRA-1,3,5(10)-TRIENES
AND PROCESS FOR THEIR PREPARATION
Carmelo Gandolfi and Marco Amendola, Milan, Italy,
assignors to Carlo Erba S.p.A., Milan, Italy, a corporation of Italy
No Drawing. Filed July 2, 1968, Ser. No. 741,857
Claims priority, application Italy, July 7, 1967,
18,113/67
Int. Cl. C07c 173/00
U.S. Cl. 260—239.55                                   43 Claims

ABSTRACT OF THE DISCLOSURE 3-acetalic, 17β-acetalic and 3,17β-bis-acetalic ether derivatives of estra-1,3,5(10)-trienes are disclosed. The disclosed compounds have, when orally administered, estrogenic activity.

---

The aims of this invention are new derivatives of cyclopentane-polyhydrophenantrenes and methods for their preparation. More specifically, this invention refers to new 3-acetalic, 17β-acetalic and 3,17β-bis-acetalic ether derivatives of estra-1,3,5(10)trienes, which may be represented by the following general formula:

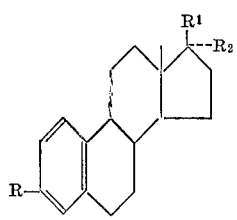

wherein:

R is a member selected from the group consisting of H, OH, alkoxy, lower alkyl, acyloxy, benzyloxy: $C_6H_5$—$CH_2O$; carbobenzyloxy:
$$C_6H_5—CH_2O—CO—O$$
and

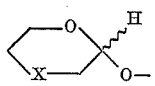

wherein X is a member selected from the group consisting of O: [2'-(1',4')-dioxanylether] and S: [2'-(1',4')-oxathianylether]

$R_1$ is a member selected from the group consisting of H, OH, acyloxy, lower alkoxy and

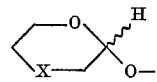

where X is a member selected from the group consisting of O: [2'-(1',4')-dioxanylether] and S: [2'-(1',4')-oxathianylether].

$R_2$ is a member selected from the group consisting of H, OH, lower alkyl, allyl, $CH_2$—$C(CH_3)$=$CH_2$, —$CH_2$—$CH$=$CH$—$CH_3$, $C_6H_5$

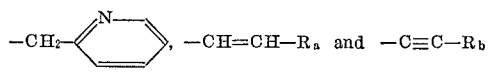, —$CH$=$CH$—$R_a$ and —$C$≡$C$—$R_b$ in which $R_a$ is selected from the group consisting of H and lower alkyl; $R_b$ is selected from the group consisting of H, $OCH_3$, $OC_2H_5$, $CF_3$, $CCl_3$, halogen and —$C$≡$C$—$CH_3$;

where $R_1$ and $R_2$ together represent a keto group,

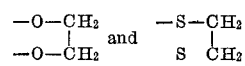

The acyloxy grouping indicated above derives preferably from carboxylic acids containing up to 18 atoms of C deriving from hydrocarbons with a saturated and unsaturated chain, linear, branched, cyclic, cycloaliphatic, or from aromatic acids, and which may be substituted by functional groups such as OH, alkoxy up to 18 atoms of C, nitro, amino or halogen. Typical ester groups are: acetate, propionate, valerate, capronate, enanthate, benzoate, cyclopentylpropionate, tertbutyl acetate, phenoxy acetate, trimethylacetate, aminoacetate, α-chloroacetate, β-chloropropionate, morpholine acetate, propionylglycolate and stearoylglycolate.

For the denomination of the substituting acetalic dioxanylether and oxathianylether, the following numeration is taken:

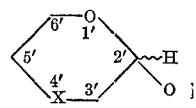

the new 3-[2'(1',4')-dioxanylethers], 17β-[2'-(1',4')-dioxanylethers] and 3,17β-bis-[2'(1,4')-dioxanylethers], as their 4'-sulpho analogues (oxyanthianylethers) which are represented by the preceding general formula, show estrogenic activity when administered orally and parenterally and are useful as estrogens and in fertility control, and as hypocholesterolemic agents and antilipodiactics; they possess also a very high hypophysis inhibiting activity with block of ovulation. Table 1 reports the estrogenic activity of some of these compounds when orally administered to the mouse in comparison with ethynilestradiol according to Dorfman's test (Endocrinology, 55, 65, 1954):

TABLE 1

| | |
|---|---|
| 17α-ethinyl - estra - 1,3,5(10) - trien - 3,17β - diol (ethinylestradiol) | 1 |
| 3 - methoxy - 17α - ethinyl - estra - 1,3,5(10) - trien-3,17β-diol(mestrenol) | 1.27 |
| Estra - 1,3,5(10) - trien - 3,17β - diol - 3-(2α - dioxa-1,4'-nylether) | 0.013 |
| Estra - 1,3,5(10) - trien - 3,17β - diol - 3 - (2'β-dioxa-1',4'-nylether) | 0.073 |
| Estra - 1,3,5(10) - trien - 3,17β - diol - 17 - (2'α-dioxa-1',4'-nylether) | 0.29 |
| Estra - 1,3,5(10) - trien - 3,17β - diol - 17 - (2'β-dioxa-1',4'-nylether) | 0.14 |
| Estra - 1,3,5(10) - trien - 3,17β - bis(2' - dioxa-1',4'-nyloxy) | 0.07 |
| 17α - ethinyl - estra - 1,3,5(10) - trien - 3,17β - diol-3-(2'-dioxa-1',4'-nylether) | 0.07 |
| 17α - ethinyl - estra - 1,3,5(10 - trien - 3,17β - [bis (2'-dioxa-1',4'-nyloxy)] | 0.18 |
| Estra - 1,3,5(10) - trien - 3,17β - diol - 3 - (2'β-oxathia-1',4'-nylether) | 0.005 |
| Estra - 1,3,5(10) - trien - 3,17β - diol - 17 - (2'β-oxathia-1,4'-nylether) | 0.045 |

These data show that the mentioned compounds have, when orally administered, a certain estrogenic activity. Table II reports the contraceptive activity after oral administration of some of these compounds according to Kincl and Dorfman's tests in comparison with mestranol.

TABLE II

| Compound | γ | Preg- nancies, percent | Foetuses Nos. Average | Range |
|---|---|---|---|---|
| Mestranol | 5 | 80 | 9.7 | 0–17 |
| | 15 | 65 | 2.1 | 0–12 |
| | 30 | 0 | | |
| | 45 | 0 | | |
| Estra-1,3,5(10)-trien-3,17β-diol-3-(2'α-dioxa-1',4'-nylether). | 45 | 90 | 12.0 | 0–18 |
| Estra-1,3,5(10)-trien-3,17β-diol-17-(2'α-dioxa-1',4'-nylether). | 5 | 37.0 | 1.5 | 0–9 |
| | 15 | 0 | | |
| Estra-1,3,5(10)-trien-3,17β-diol-17-(2'β-dioxa-1',4'-nylether). | 5 | 37.0 | 1.5 | 0–9 |
| 3-methoxy-estra-1,3,5(10)-trien-17β-(2'α-dioxa-1',4'-nyloxy) | 15 | 0 | | |
| 17α-ethinyl-estra-1,3,5(10)-trien-3,17β-diol-3-(2'-dioxa-1',4'-nylether. | 30 | 80 | 12 | 0–17 |
| 17α-ethinyl-estra-1,3,5(10)-trien-3,17β-[bis-(2'-dioxa-1',4'-nyloxy)]. | 45 | 70 | 8 | 0–16 |
| Estra-1,3,5(10)-trien-3,17β-diol-17-(2'β-oxathia-1',4'-nylether). | 45 | 100 | 12 | 0–16 |
| | 135 | 0 | | |

The above reported results show that these new compounds, characterized by an estrogenic activity, after oral administration, lower than that one of ethinylestradiol and its methylether, have a considerable action on fertility control. This activity is quite evident also at doses where mestranol is scarcely effective. By operating on pairs of wether females with non-wether females according to parabiosis test, which is particularly suitable for the determination of the ability of the testing substances to stop the gonadotropic hypophysial secretion, the effectiveness of the new compounds in the sense suggested finds further confirmation.

TABLE III

| Substance | γ of administered substance | Weight of the ovaries in non-wether partner (mg.) |
|---|---|---|
| Untreated | | 182 |
| Mestranol | 0.1 | 83 |
| Estra-1,3,5(10)-trien-3,17β-diol-17-(2'α-dioxa-1',4'-nylether). | 0.14 | 60 |
| | 0.2 | 37 |
| Estra-1,3, (10)-trien-3,17β-diol-17(2'β-dioxa-1',4'-nylether). | 0.15 | 62 |
| | 0.2 | 48 |
| 3-methoxy-estra-1,3,5(10)-trien-17β-(2'α-dioxa-1',4'-nyloxy). | 0.15 | 58 |
| | 0.2 | 38 |
| Estra-1,2,5(10)-trien-3,17β-diol-17(2'β-oxathia-1',4'-nylether). | 0.15 | 93 |
| | 0.2 | 60 |

The whole of the data reported proves that the substances, subject of this patent are able to prevent fertility and at the same time can be used for the control of the troubles of female climateric. These compounds are prepared by reacting, in the presence of a catalyst selected from the group consisting of phosphorus oxychloride, polyphosporic acid, HCl, $H_2SO_4$, p-toluenesulphonic acid, trifluoroacetic acid, malonic acid, oxalic acid, perchloric acid, $BF_3$, the compounds of the general formula

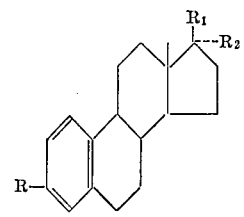

wherein

R is a member selected from the group consisting of H, OH, alkoxy, lower alkyl, acyloxy, benzyloxy, $C_6H_5$—$CH_2O$; carbobenzyloxy;

$$C_6H_5—CH_2O—CO—O$$

$R_1$ is a member selected from the group consisting of H, OH, lower acyloxy;

$R_2$ is a member selected from the group consisting of H, OH, lower alkyl, allyl, $CH_2$—$C(CH_3)$—$CH_2$, —$CH_2$—$CH$=$CH$—$CH_3$ $C_6H_5$,

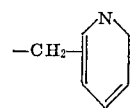

—CH=CH—$R_a$ and —C≡C—$R_b$;

in which $R_a$ is selected from the group consisting of H and lower alkyl; $R_b$ is seelcted from the group consisting of H, $OCH_3$, $OC_2H_5$, $CF_3$, $CCl_3$, halogen, —C≡CH, —C≡C—$CH_3$;

$$\begin{array}{cc} -O-CH_2 & -S-CH_2 \\ | & | \\ -O-CH_2 & -S-CH_2 \end{array} \text{ and }$$

The above acyloxy grouping derives preferably from carboxylic acids containing up to 18 atoms of C deriving from hydrocarbons with a saturated and unsaturated chain, linear, branched, cyclic, cycloaliphatic, or from aromatic acids, and which can be substituted by functional groups such as OH, alkoxy, up to 5 atoms of C, acyloxy, up to 18 atoms of C, nitro, amino or halogen.

Typical ester groupings: acetate, propionate, valerate, capronate, enanthate, benzoate, trimethylacetate, tert-butyl acetate, phenoxy acetate, cyclopentylpropionate, amino acetate, α-chloro acetate, β-chloropropionate, morpholin-acetate, propionylglycolate, stearoylglycolate; with a compound selected from the group consisting of:1,4-dioxene:

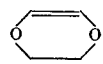

(R. K. Summerbell and R. R. Umhoefer: J. Am. Chem. Soc., 61, 3016 (1939)), and of 1,4-oxathiene:

(W. E. Parham, I. Gordon and J. D. Swalen: J. Am. Chem. Soc., 74, 1824 (1952)), working in anhydrous conditions with one, two and more equivalents of cyclic vinylether for each of the hydroxylic groups present in the original steroid material, alone and in an inert solvent selected from the group consisting of benzene, toluene, tetrahydrofurane, ethyl ether, dimethyl sulphoxide, ethyl acetate, dimethylformamide, dioxane and their mixtures, at a temperature between 0° C. to 180° C., in a period of time between 5 minutes and 96 hours. Thus, for example, starting from estrone (I) on reaction with 1,4-dioxene in benzene in the presence of catalytic quantities of p-toluensulphonic acid, 3(2'-(1',4')-dioxanylether) is obtained (II) as on reaction with 1,4-oxathiene, estra - 1,3,5(10) - triene-3-ol-17-one-3(2'-(1',4')-oxathianylether) is obtained (III)

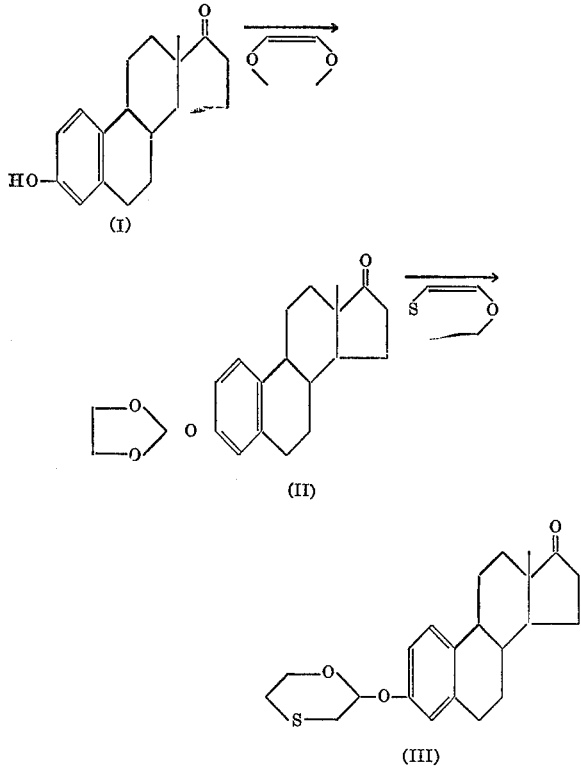

The compound II and III show variable rotatory powers according to the solvents from which they are crystallized and from the number of crystallizations. The unrefined product of each reaction is, in fact, made up of a mixture (about 1:1) of two diastero-isomers which form in the introduction of the semiacetalic ether into the new molecule, the atom of semiacetalic C determining a new centre of asymmetry.

The formulae which follow serve as illustrations:

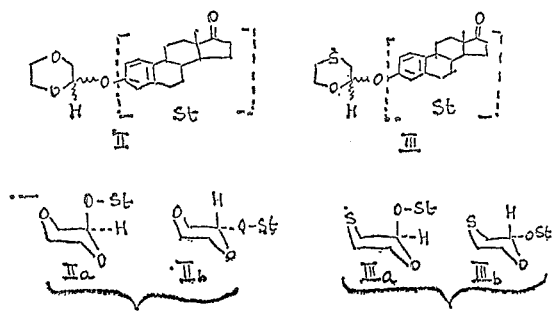

Both the compounds II and III are separable by fractionated crystallization, by chromatography in an alumina and in a silica gel column, or by gas chromatography, into the pure anomers, one with a greater rotatory power (α-anomer), the other with a lesser rotatory power (β-anomer). These anomers differ, therefore, on account of the steric configuration of the substituting H and OSt in which St is the steroidal residue at the semiacetalic C of the residue 2'(1',4')-oxathianyl (III) and of the residue 2'-(1',4')-dioxanyl (II).

Assuming as a graphic configuration of the α-anomer that in which the atom of H is axial and the substituting OSt is equatorial, and for the β-anomer the opposite configuration, the two compounds can be represented thus:

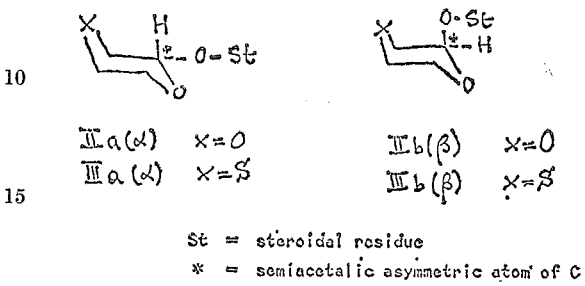

Consequently, by reacting the estrone (estra-1,3,5(10)-triene-3-ol-17-one) (I) with 1,4-dioxene, a product estra-1,3,5(10) - triene - 3 - ol - 17 - one - 3(2' - dioxa - 1',4'-nylether) is obtained (II) a mixture of two compounds between their diastero-isomers: α- and β-anomers, which may be split by fractionated crystallization and by column chromatography into the two components of the mixture: estra - 1,3,5(10) - triene - 3 - ol - 17 - one-3(2'α-(1',4')-dioxanylether) (IIa), the anomer with the most positive rotatory power of the two anomers and estra - 1,3,5(10) - triene - 3 - ol - 17 - one - 3(2'β - (1',4')-dioxanylether) (IIb) the anomer with the most negative optic rotatory power of the two.

In the same way as the reaction of the estrone (I) with 1,4-oxathiene, a product estra-1,3,5(10)-triene-3-ol-17-one-3-(2'-oxathianylether) is obtained (III) which mixture of the two anomers (α and β) may be separated by fractionated crystallization and by column chromatography into the components estra-1,3,5(10)-triene-3-ol-17-one-3(2'α-oxathianylether) (IIIa) and estra-1,3,5(10)-triene-3-ol-17-one-3-(2'β-oxathianylether) (IIIb).

Thus, during the reaction described above, we always obtain a compound which is a mixture of the two compounds which are themselves diastero-isomers, of which one, the α-anomer, is that of the two with the most positive optico-rotatory power, the other, the β-anomer has the most negative opticorotatory power. This mixture is constantly separable into the two pure components α- and β-anomers. The pure anomers (α-anomer and β-anomer) are obtainable as previously described, by separation through fractionated crystallization, through column chromatography and through preparative chromatography on a thin layer of the mixture of the two anomers, obtained by the reaction of a steroid of the general formula:

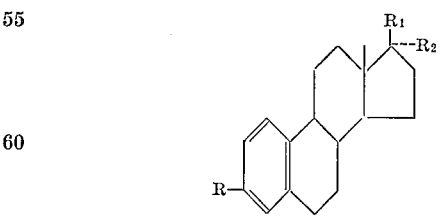

previously described with the 1,4-dioxene and with 1,4-oxathiene. The single pure anomers are, on the other hand, obtainable starting from a pure anomer by successive reactions on this compound, as starting from the mixture of the α- and β-anomers, reacting this mixture if, in its course, one of the anomers be separable from the other because it is less soluble in the reaction mixture.

Thus, for example, starting from the estrone (I) on reaction in toluene with 1,4-dioxene in the presence of catalytic quantities of $POCl_3$, the estra-1,3,5(10)-triene-3-ol-17-one-3(2'-(1',4')-dioxyanylether, a mixture of the two diasteroisomers is obtained.

When this compound is reacted at room temperature with NaBH₄ in a mixture consisting of methanol and a co-solvent member selected from the group consisting of dioxane, tetrahydrofuran, dimethylformamide and pyridine, at the end of the reaction a crystallized product is separated, which when filtered, suspended in water and filtered, supplies the α-anomer: estra-1,3,5(10)-triene-3, 17β-diol-3- (2'α(1',4')-dioxanylether) with a degree of purity between 88 and 95%, from which, with simple crystallization by a solvent selected from the group consisting of ethanol, methanol, ethyl acetate and acetone, the pure α-anomer with a total yield of 80% may be obtained.

On dilution of the filtrate a crystalline product is separated which consists of the essentially pure β-anomer (80–90% purity) from which, on successive crystallization by a solvent selected from the group consisting of ethyl ether, isopropyl ether, acetone, methanol, the estra-1,3,5(10) - triene - 3,17β - diol - 3(2'β - (1',4') - dioxanylether) is obtained.

On the other hand, by reacting the estrone with 1,4-oxathiene, the estra - 1,3,5(10)-triene-3-ol-17-one-3(2', 4')-oxathianylether, a mixture of the two anomers, is obtained, from which mixture, on two successive crystallizations by a solvent selected from the group consisting of acetone, ethyl acetate, metanol, etthanol and isopropanol, the pure β-anomer estra-1,3,5(10)-triene-3-ol-17-one-3-(2'β-(1',4')-oxathianylether) is obtained, from which, on successive reaction with NaBH₄ in methanol dioxane, the pure β-anomer: estra - 1,3,5(10) - triene - 3,17β - diol - 3(2'β-(1',4')-oxathianylether) is obtained.

When the residue of the mother liquors of the crystallization of the β-anomer of the estra-1,3,5(10)-triene-3-ol-17-one-3(2'-oxathianylether), enriched in α-anomer is treated cold with sodium borohydride in methanol in the presence of a solvent selected from the group consisting of dioxane, tetrahydrofurane, pyridine, dimethylformamide, a solid product constituted from estra-1,3,5(10)-triene - 3,17β - diol - 3(2'β - (1',4') - oxathianylether) separates which is separated by filtration and purified by crystallization. The filtrate, after neutralization and dilution with water, allows a crystalline product to separate, which, when collected by filtration, gives a crude estra-1,3,5(10) - triene - 3,17β - diol - 3(2' - oxathianylether) which contains 80–92% of the α-anomer from which the pure α-anomer is obtained by simple crystallization.

Thus, from this compound dissolved in pyridine by reaction with pyridine and chromic anhydride, we obtain the pure estra-1,3,5(10)-triene-3-ol-17-one-3(2'α-(1',4')-oxathianylene), from which, by reacting with acetylene in a solvent selected from the group consisting of tert-butanol, ethyl ether, toluene, ammonia, ethylendiamine, tetrahydrofurane, dimethylsulphoxide, dimethylformamide, dimethylacetamide, tert-amylic alcohol and their mixtures in the presence of a compound selected from the group consisting of potassium tert-butylate, Na tert-butylate, sodium amide, potassium amide, lithium amide, potassic hydrate, lithium, sodium, potassium ferric nitrate the 17α-ethinyl-estra-1,3,5(10)-triene-3,17β-diol-3(2'α-(1',4')-oxathianylether) is obtained.

In the same way it is possible to prepare the corresponding 3(2'α - (1',4') - dioxanylether) and the pure β-anomers, 17α-ethinyl-estra-1,3,5(10)-triene-3,17β-diol-3(2'β-1',4'-oxathianylether) and 17α - ethinyl-estra-1,3, 5(10)-triene - 3,17β - diol-3(2'β-dioxanylether) starting from the corresponding pure anomers 17-ketones. The hydrogenation in pyridine-dioxane in the presence of Pd/CaCO₃ at 2% of the 17α-ethinyl-derivatives leads to the corresponding 17α-vinyl derivatives, while if the reaction is carried out in alcohol the corresponding 17α-ethyl derivatives are attained.

If these reactions are carried out, not on the pure anomers, but on the crude product of the reaction of the estrone, with 1,4-dioxene and 1,4-oxathiene, the mixture of the anomers α and β of the 17α-ethinyl-estradiol-3-acetalic ether and successively of the 17α vinyl and 17α ethyl derivatives will be obtained, mixtures which can again be split into the pure α- and β-anomer components.

In the same way, starting from the compounds of the general formula:

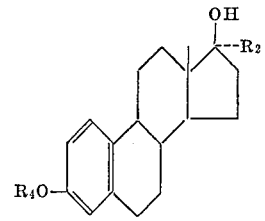

wherein R₂ is a member selected from the group consisting of H, lower alkyl, allyl,

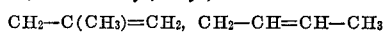

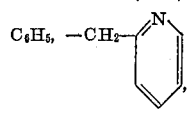
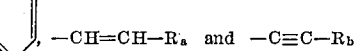

in which R_a is selected from the group consisting of H and lower alkyl; R_b is selected from the group consisting of H, OCH₃, OC₂H₅, CF₃, CCl₃, halogen, —C≡CH, —C≡C—CH₃; and R₄ is a member selected from the group consisting of C₆H₅—CH₂ and C₆H₅—CH₂—OCO— and benzoate on reaction with a member selected from the group consisting of 1,4-dioxene and 1,4-oxathiene, in the presence of a catalyst selected from the group consisting of phosphorus oxychloride, polyphosphoric acid, hydrogen chloride, conc. sulphuric acid, p-toluenesulphonic acid, trifluoro acetic acid, perchloric acid, BF₃, malonic acid, oxalic acid, operating in anhydrous conditions with one, two and more equivalents of cyclic vinylether, alone, or in an inert solvent selected from the group consisting of benzene, toluene, tetrahydrofurane, ethyl ether, dimethylsulphoxide, ethyl acetate, dimethylformamide, dioxane and their mixtures, at a temperature between 0° C. and 180° C., in a period of time between 5 minutes and 96 hours, the compounds of the following general formula are obtained:

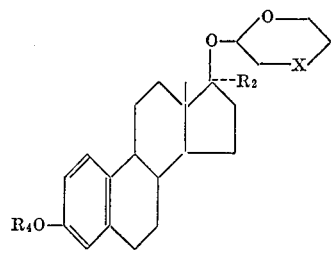

wherein X is a member selected from the group consisting of O, S; R₂ is a member selected from the group consisting of H, lower alkyl, allyl,

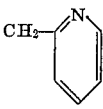
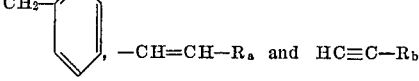

in which R_a is selected from the group consisting of H and lower alkyl; R_b is selected from the group consisting of H, OCH₃, OC₂H₅, CF₃, CCl₃, halogen, —C≡CH, —C≡C—CH₃; and R₄ is a member selected from the group consisting of C₆H₅—CH₂ and

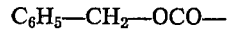

These compounds are mixtures of the two diastero-isomers 17β(2'α acetalic ether) and 17β(2'β acetalic ether) which can be split into the two pure anomers, one with a greater rotatory power (α-anomer), the other with a lesser rotatory power (β-anomer). All these compounds, that is the mixture of the 17β(2')diastero-isomers, as the pure α-anomer and β-anomer by successive debenzilation carried out by operating with hydrogen in the presence of a catalyst selected from the group consisting of Pt of Adams, Ni Raney and Pd/C in a solvent selected from the group of ethanol, dioxane, tetrahydrofurane, ethyl acetate and their mixtures, and also by operating with nascent hydrogen on reaction with an alkaline metal and a corresponding borohydride with lower aliphatic alcohol, as ethanol, methanol, n-propanol, and isopropanol refluxed in the presence or otherwise of C palladium, the compounds of the following general formula are obtained:

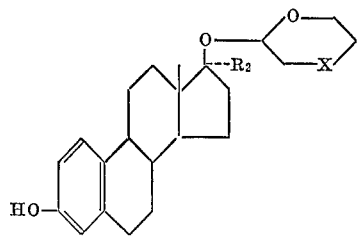

wherein X is a member selected from the group consisting of S and O, in which the 17β-acetalic ether is the pure α-anomer, the pure β-anomer, and the mixture of the two in which $R_2$ is a member selected from the group of H, lower alkyl, allyl,

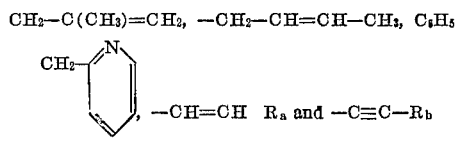

in which $R_a$ is selected from the group consisting of H and lower alkyl; $R_b$ is selected from the group consisting of H, $OCH_3$, $OC_2H_5$, $CF_3$, $CCl_3$, halogen, —C≡CH and —C≡C—$CH_3$.

In this case also the mixture of the diastero-isomers is separable into the pure anomers α and β.

When the 3-(2′oxathianylethers) and the 3-(2′dioxanylethers) of the estradiol, a mixture of the α- and β-anomers, the pure α- and β-anomers, represented by the following general formula:

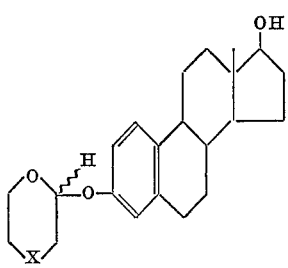

wherein X is a member selected from the group consisting of O and S, and similarly when the 17β(2′-oxathianylethers) and the 17β(2′-dioxathianylethers) of the estradiol, represented by the following general formula:

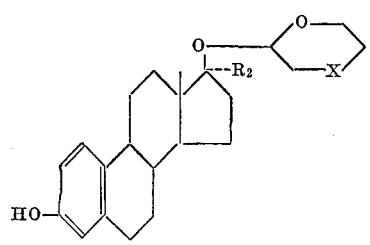

wherein X is a member selected from the group consisting of S and O, and $R_2$ is a member selected from the group consisting of H, lower alkyl, allyl,

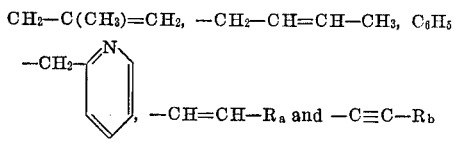

in which $R_a$ is selected from the group consisting of H and lower alkyl; $R_b$ is selected from the group consisting of H, $OCH_3$, $OC_2H_5$, $CF_3$, $CCl_3$, halogen, —C≡CH and —C≡C—$CH_3$ are treated in pyridine and in an inert solvent selected from the group consisting of benzene, toluene, tetrahydrofurane, dioxane in the presence of a base selected from the group consisting of triethylamine, pyridine, piperidine with an acylating agent selected from the group consisting of carboxyl acid chloride and carboxyl acid anhydride containing up to 18 atoms of C and deriving from hydrocarbons with a saturated and unsaturated chain, linear, branching, cyclic, cycloaliphatic or from aromatic acids, and which can be substituted by functional groups such as hydroxyl, alkoxy up to 5 atoms of C, acyloxy up to 18 atoms of C, nitro, amino and halogen, typical ester groups being: acetate, propionate, valerate, caprionate, enanthate, benzoate, trimethylacetate, tert-butyl acetate, cyclopentyl propionate, amino acetate, α-chloro acetate, β-chloro propionate, morpholinacetate, propionylglycolate and stearoylglycolate, the compounds represented by the following general formula are obtained:

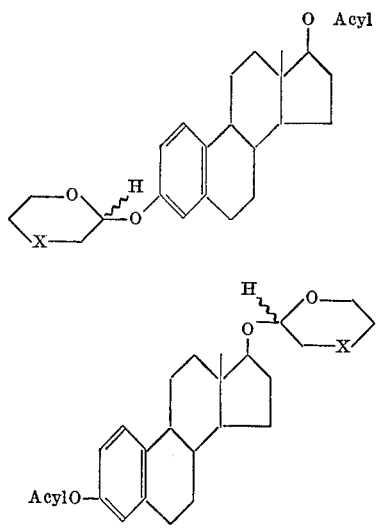

wherein X is a member selected from the group consisting of S and O, in which the acetalic ethers are the mixture of the anomers and the pure α- and β-anomers in which acyl is the residue of a carboxylic acid as, previously described, and $R_2$ is a member of the group consisting of H, lower alkyl, allyl,

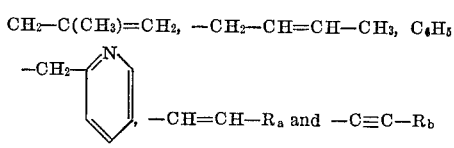

in which $R_a$ is selected from the group consisting of H and lower alkyl; $R_b$ is selected from the group consisting of H, $OCH_3$, $OC_2H_5$, $CF_3$, $CCl_3$, halogen, —C≡CH and —C≡C—$CH_3$.

On the other hand, when the compounds of the general formula:

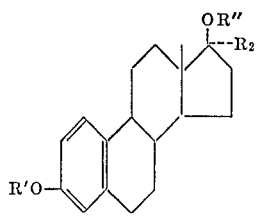

in which R' and R'' are a member selected from the group consisting of H,

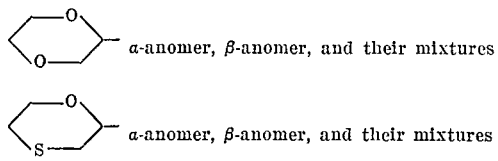

and $R_2$ is a member selected from the group consisting of H, lower alkyl, allyl,

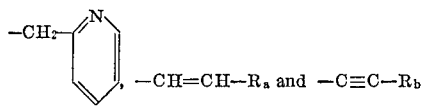

in which $R_a$ is selected from the group consisting of H and lower alkyl; $R_b$ is selected from the group consisting of H, $OCH_3$, $OC_2H_5$, $CF_3$, $CCl_3$, halogen, —C≡CH and —C≡C—$CH_3$; are reacted with a member selected from the group consisting of 1,4-dioxane and 1,4-oxathiene, in the presence of a catalyst selected from the group consisting of phosphorus oxychloride, polyphosphorus acid, hydrogen chloride, conc. sulphuric acid, p-toluen-sulphuric acid, trifluoro acetic acid, perchloric acid, $BF_3$, malonic acid, oxalic acid, operating in anhydrous conditions with one, two or more equivalents of cyclic vinylether, alone or in an inert solvent selected from the group consisting of benzene, toluene, tetrahydrofurane, ethyl ether, dimethylsulphoxide, ethyl acetate, dimethylformamide, dioxane and their mixtures, at a temperature between 0° C. to 180° C. in a period of time between 5 minutes and 96 hr., the compounds of the following general formula are obtained:

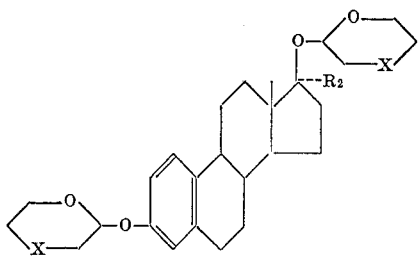

wherein X is a member selected from the group consisting of O, S; wherein $R_2$ is a member selected from the group consisting of H, lower alkyl, allyl,

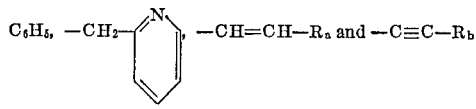

$R_a$ is selected from the group consisting of H and lower alkyl; $R_b$ is selected from the group consisting of H, $OCH_3$, $OC_2H_5$, $CF_3$, $CCl_3$, halogen, —C≡CH and —C≡C—$CH_3$; in which the acetalic ethers are the pure anomers 3(2'α), 17(2''α); 3(2'α), 17(2''β), 3(2'β), 17(2''α); 3(2'β), 17(2''β) and their mixtures.

The examples illustrate, but do not limit, the present invention.

EXAMPLE 1

Estra-1,3,5(10)-triene-17-one-3-[2'-(1',4')-dioxanyloxy]

A suspension of 10.8 gr. of estra-1,3,5(10)-triene-3-ol-17-one in 1000 ml. of benzene is dried by distilling ⅕ of the solvent. 0.25 gr. of anhydrous p-toluensulphonic acid in 250 ml. of benzene and 32 ml. of 1,4-dioxene are added successively, and stirred overnight at 53° C. When the steroid has completely dissolved, the benzene solution is washed with a solution of NaOH 4 N and then with water until neutralized. It is evaporated from the solvent and the residual 13.2 gr. is taken up with methylene-hexane chloride. 11.43 gr. of estra-1,3,5(10)-triene-17-one-3(2'-(1',4')-dioxanyloxy is recovered; M.P. 140–146° C.; $[\alpha]_D = +132°$ ($CHCL_3$).

EXAMPLE 2

Estra-1,3,5(10)-triene-17β-ol-3(2'-(1',4')-dioxanyloxy

A solution of 2 gr. of estra-1,3,5(10)-triene-17-one-3-(2'-(1',4')-dioxanyloxy) in 30 ml. of n-propanol is refluxed and a total of 0.6 gr. of sodium is added in small portions. After total solution of the alkaline metal, it is concentrated to a low volume and completely diluted with a saturated solution of sodium chloride.

A crystalline product is separated (1.87 gr.) which after filtration is crystallized by aqueous methanol to give 1.76 gr. of estra-1,3,5(10)-triene-17β-ol-3(2'-(1',4')-dioxanyloxy); M.P. 152–161° C.; $[\alpha]_D = +64°$ ($CHCl_3$).

EXAMPLE 3

Estra-1,3,5(10)-triene-17β-ol-3(2'α(1',4')-dioxanyloxy)

7.5 gr. of estra-1,3,5(10)-triene-17-one-3(2'-(1',4')-dioxanyloxy) are dissolved in 20 ml. of dioxane and to the solution are added 40 ml. of methanol and successively, in small portions, 3 gr. of sodium borohydride. It is kept at room temperature for 4 hr. during which time an abundant crystalline precipitate separates which is filtered and washed on the filter with 15 ml. of methanol. The dioxane methanolic solution is reserved (solution A). The crystalline product is suspended in 250 ml. of water and is successively filtered to give 3.42 gr. of crude estra-1,3,5(10)-triene-17β-ol-3(2'α-(1',4')-dioxanyloxy); M.P. 182–186° C.; $[\alpha]_D = +112°$ ($CHCl_3$) which on crystallization by ethanol produces 2.2 gr. of pure estra-1,3,5(10)-triene-17β-ol-3(2'α-(1',4')-dioxanyloxy); M.P. 191–193° C.; $[\alpha]_D = +149 \pm 1°$ ($CHCl_3$). From the mother liquors by successive concentration are obtained 0.26 gr. of estra-1,3,5(10)-triene-17β-ol-3(2'-(1',4')-dioxyanyloxy); M.P. 161–170° C.; $[\alpha]_D = +62°$ (mixture of the two anomers α and β≈1:1) and 0.320 gr. of estra-1,3,5(10) - triene - 17β-ol-3(2'(1',4')-dioxanyloxy; M.P. 140–145° C.; $[\alpha]_D = -2°$ ($CHCl_3$) crude β form.

EXAMPLE 4

Estra-1,3,5(10)-triene-17β-ol-3(2'β(1',4')-dioxanyloxy

The reserved solution A (according to Example 3) is diluted with water. The crystalline precipitate which forms is filtered and washed with water until neutralized. After drying in a vacuum, 3.4 gr. of a product is obtained which, on crystallization by ethanol, supplies 0.450 gr. of estra-1,3,5(10) - triene - 17β-ol-3(2'-(1',4')-dioxanyloxy; M.P. 158–167° C.; $[\alpha]_D = +60°$ ($CH_3Cl_3$) which is reserved. The mother liquors are evaporated to dryness, and on crystallization by ethyl ether supply 2.6 gr. of a product with an M.P. of 141–145° C.; $[\alpha]_D = 1°$ ($CHCl_3$). This compound is dissolved in 40 ml. of ethyl ether and on slow crystallization 1.82 gr. of pure estra-1,3,5(10)-triene-17β-ol-3(2'β-(1',4')-dioxanyloxy) with M.P. 151–152° C.; $[\alpha]_D = -24 \pm 2°$ ($CHCl_3$) separate.

EXAMPLE 5

Estra-1,3,5(10)-triene-17β-ol-3(2′β(1′,4′)-dioxanyloxy)-17 acetate 0.3 gr. of estra-1,3,5(10)-triene-17β-ol-3(2′-(1′,4′)-dioxanyloxy) $[\alpha]_D=-2°$, obtained as a by-product in Example 3, is dissolved in 1.2 ml. of pyridine and treated with 0.6 ml. of acetic anhydride. Kept overnight at room temperature, the solution is then diluted with water and the mass which separates repeatedly extracted with ethyl ether.

The ethereal phases are combined, washed with water until neutralized and dried over sodium sulphate. Filtration and concentration of the solvent to a low volume gives gr. 0.260 of product at $[\alpha]_D=-34°$, which on successive crystallization from methanol gives 0.22 gr. of pure estra-1,3,5(10) - triene - 17β-ol-3(2′β(1′,4′)-dioxanyloxy-17 acetate with M.P. 99–101° C.; $[\alpha]_D=-40°$ (CHCl$_3$).

EXAMPLE 6

Estra-1,3,5(10)-triene-17β-ol-3(2′β-(1′,4′)-dioxanyloxy)

0.18 gr. of estra-1,3,5(10)-triene-17β-ol-3(2′β-(1′,4′)-dioxanyloxy)-17 acetate is refluxed for 45′ with 8 ml. methanolic potassium hydrate solution 2.5% then concentrated to ½ volume, cooled and diluted with 3 volumes of water. The separated crystalline product, filtered, washed with water until neutralized and dried, gives 0.13 gr. of estra-1,3,5(10)-triene-17β-ol-3(2′β(1′,4′)-dioxanyloxy); M.P. 150–152° C.; $[\alpha]_D=-23°$ (CHCl$_3$).

EXAMPLE 7

Estra-1,3,5(10)-triene-17-one-3(2′α(1′,4′)-dioxanyloxy)

To a solution of 3.5 gr. of chromic anhydride in 35 ml. of pyridine is added a solution of 3.5 gr. of pure estra-1,3,5(10-triene-17β-ol-3(2′α-(1′,4′)-dioxyanyloxy). After a night at room temperature, the suspension is diluted with 700 ml. of water and the separated crystalline product is filtered, washed with water and dried over a water bath. The residue is dissolved in ethyl acetate, and the resulting solution, after decolouration with animal charcoal and concentration to a small volume and cooling, allows the separation of 2.83 gr. of estra-1,3,5(10)-triene-17-one-3(2′α(1′,4′)-dioxanyloxy; M.P. 161–161.5° C.; $[\alpha]_D=+212\pm2°$ (CHCl$_3$).

EXAMPLE 8

Estra-1,3,5(10)-triene-17-one-3(2′β(1′,4′)-dioxanyloxy)

Proceeding as in Example 7, but starting from the β-anomer, 2.67 gr. of estra - 1,3,5(10) - triene-17-one-3 (2′β(1′,4′)-dioxanyloxy) is obtained; M.P. 150–151° C.; $[\alpha]_D=+41°$ (CHCl$_3$).

EXAMPLE 9

Estra-1,3,5(10)-triene-17-one-3(2′(1′,4′)-oxathianyloxy)

To a suspension of 1.2 gr. of estra-1,3,5(10)-triene-3-ol-17-one in 10 ml. of 1,4-oxathiene cooled to 0° C. is added 0.15 ml. of POCl$_3$. The suspension is left to return spontaneously to room temperature and in 24 hrs. the complete solution of the steroid is obtained. Diluted with ethyl ether, the solution is thoroughly washed with NaOH 4 N and with water. Anhydrated over Na$_2$SO$_4$, the solvent is evaporated and the residue is absorbed on alumina oxide (40 gr.) and on elution with benzene provides 1.5 gr. of estra-1,3,5(10)-triene-17-one-3(2′(1′,4′) - oxathianyloxy) M.P. 180–186° C.; $[\alpha]_D=+124°$ (CHCl$_3$).

EXAMPLE 10

Estra-1,3,5(10)-triene-17-one-3(2′β(1′,4′)-oxathianyloxy) and α-anomer

To a suspension of 10 gr. of estra-1,3,5(10)-triene-3-ol-17-one in 750 ml. of anhydrous benzene is added 0.25 gr. of anhydrous p-toluene sulphonic acid in 250 ml. of benzene and 30 ml. of 1,4-oxathiene.

The solution is kept at room temperature for 48 hrs. and then the procedure in Example 1 is followed. A residue of 12.6 gr. of estra-1,3,5(10)-triene-17-one-3(2′(1′,4′)-oxathianyloxy) is obtained which is crystallized from 500 ml. of ethyl acetate to give 6.8 gr. of product with M.P. 202–204° C.; $[\alpha]_D=+86°$. Successive crystallization from 250 ml. of ethyl acetate affords 4.6 gr. of estra - 1,3,5(10)-triene-17-one-3-(2′β(1′,4′) - oxathianyloxy) M.P. 211.5–212.5 C.; $[\alpha]_D=+70°$ (CHCl$_3$). The mother liquors of the first crystallization from ethyl acetate are evaporated to dryness, dissolved in benzene and absorbed on alumina oxide. On elution with cyclo hexane ethyl acetate (75/25), 2.8 g. of product is obtained which, after two successive crystallizations from ethyl ether, supplies 1.88 gr. of estra-1,3,5(10)-triene-17-one-3(2′α(1′,4′)-oxathianyloxy); M.P. 185.5–186° C.; $[\alpha]_D=+178°$ (CHCl$_3$).

EXAMPLE 11

17α-ethinyl-estra-(1,3,5(10)-triene-17β-ol-3(2′(1′,4′)-dioxanyloxy)

A solution of 1 gr. of estra-1,3,5(10)-triene-17-one-3 (2′(1′,4′)-dioxanyloxy) in 7 ml. of toluene and 50 ml. of anhydrous ethyl ether is de-aerated at 0–5° C. by bubbling presaturated nitrogen with toluene ether, and acetylene saturate. While stirring, and in a current of acetylene saturate of ether toluene, 12 ml. of a solution of K-tert-butylate in tert-butanol, prepared by dissolving 0.65 gr. of K in 15 ml. of tert-butanol, is added.

The bubbling of the acetylene is maintained for 8 hrs. It is kept overnight at 0–5° C. and is then poured onto a solution of NH$_4$Cl, 10%; the organic phase is separated which, after prolonged washing with a solution of NH$_4$Cl at 10% and with water until neutralized, is anhydrified over Na$_2$SO$_4$ and evaporated to dryness. The residue, on crystallization from methanol supplies 0.85 gr. of 17α-ethinyl - estra - 1,3,5(10) - trien-17β-ol-3(2′-(1′,4′) - dioxanyloxy); M.P. 167–171° C.; $[\alpha]_D=-7°$ (CHCl$_3$).

Proceeding as in Example 11, but starting from the corresponding 17-ketones, the following were prepared:

17α-ethinyl-estra-1,3,5(10)-triene-17β-ol-3(2′α-(1′,4′)-dioxaniloxy) $[\alpha]_D=+90°$ (CHCl); M.P. 202–204° C.

17α-ethinyl-estra-1,3,5(10)-trien-17β-ol-3(2′β(1′,4′)-dioxanyloxy) $[\alpha]_D=-70°$ (CHCl$_3$); M.P. 163–164° C.

17α-ethinyl-estra-1,3,5(10)-triene-17β-3(2′α(1′,4′)-oxathianyloxy)

17α-ethinyl-estra-1,3,5(10)-triene-17β-ol-3(2′β(1′,4′)-oxathianyloxy)

17α-ethinyl-estra-1,3,5(10)-trien-17β-ol-3(2′-(1′,4′)-oxathianyloxy).

EXAMPLE 12

Estra - 1,3,5(10) - triene - 3[(2′β),17β(2″β)-bis - 1′,4′-dioxanyloxy] and estra - 1,3,5(10) - trien - [3(2′), 17β(2″)-bis-(1′,4′)-dioxanyloxy]

To a solution of 2 gr. of estradiol in 100 ml. of anhydrous benzene is added a solution of 40 mg. of anhydrous p-toluen-sulphonic acid in 50 ml. of benzene.

After 48 hrs. at room temperature, the solution is neutralized by the addition of 0.6 ml. of pyridine. The organic phase is washed with a solution of sodium bicarbonate at 5% and with water until neutralized. Anhydrated over sodium sulphate, the solution is then filtered through a column of 100 gr. alumina (Act. II) and the eluates are evaporated to dryness.

2.83 gr. of product is obtained which isolates from acetone 0.425 gr. of estra 1,3,5(10) - triene-3(2′β)-17β (2″β)-[bis-(1′,4′)-(1‴,4″)-dioxanyloxy] with M.P. 152–154° C.; $[\alpha]_D=-70°$ (CHCl$_3$). The mother liquors are evaporated to dryness, and on further crystallization by aqueous ethanol give 2.2 gr. of estra-1,3,5(10)-trien-3(2′), 17β(2″)-[bis-(1′,4′)(1‴,4″) - dioxanyloxy]; M.P. 100–114° C.; $[\alpha]_D=+50°$ (CHCl$_3$).

The same procedure, starting from 17α-ethinyl-estradiol and from other 17α-alkyl estradiols, prepares:

17α-methyl-estra-1,3,5(10)-triene-3,17β[-bis-(1′4′)-(1″,4″)-dioxanyloxy]; [α]$_D$=+57° (CHCl$_3$)
17α-methyl-estra-1,3,5(10)-triene-3,17β[bis-(1′,4′)-(1″,4″)-dioxanyloxy]; [α]$_D$=−1° (CHCl$_3$); M.P. 82–86° C.
17α-vinyl-estra-1,3,5(10)-triene-3,17β[bis-(1′,4′)-(1″,4″)-dioxanyloxy]
17α-methyl-estra-1,3,5(10)-triene-3,17β[bis-(1′,4′)-(1″,4″)-oxathianyloxy]
17α-vinyl-estra-1,3,5(10)-triene-3,17β[bis-(1′,4′)-(1″,4″)-oxathianyloxy]
17α-ethinyl-estra-1,3,5-(10)-triene-3,17β[bis-(1′,4′)-(1″,4″)-oxathianyloxy]
17α-isopropyl-estra-1,3,5(10)-triene-3,17β[bis-(1′,4′)-(1″,4″)-oxathianyloxy]
estra-1,3,5(10)-triene-3,17β[bis-(1′,4′),(1″,4″)-oxathianyloxy]

EXAMPLE 13

17α-ethinyl-estra-1,3,5-(10)-triene-3-ol-17β [2′-(1′, 4′)-dioxanyloxy]

To a solution of 3.5 gr. of 17α-ethinyl-estra-1,3,5(10)-triene-3,17β-diol-3-acetate in 80 ml. of dioxane is added 25 mg. of anhydrous p-toluene-sulphonic acid and 10 gr. of p-dioxene. It is kept at room temperature for 12 hr., neutralized with 1 ml. of pyrine and diluted with water.

The crystallized product is filtered and crystallized from aqueous methanol to give 3.12 gr. of 17α-ethinyl-estra - 1,3,5(10) - triene - 3-ol-17β-[2′(1′,4′)-dioxanyloxy]-3-acetate with M.P. 112–116° C. The product is dissolved in 25 ml. of methanolic potassium hydrate solution at 1% and refluxed for 25′.

It is concentrated, diluted with water and filtered. The filtrate is neutralized with a solution of 10% monosodium phosphate in water, and the precipitate collected to give 2.27 gr. of 17α-ethinyl-estra-1,3,5(10)-triene-3-ol-17β [2′-(1′,4′)dioxanyloxy] [α]$_D$=+11° (CHCl$_3$).

The same procedure, starting from the corresponding estratrienes-17α-substituted-3,17β-diol - 3 - acetates, prepares:

17α-methyl-estra-1,3,5(10)-triene-3-ol-17β[2′(1′,4′)-dioxanyloxy] and 3-acetate
17α-methyl-estra-1,3,5(10)-triene-3-ol-17β[2′(1′,4′)-oxathianyloxy]
17α-ethinyl-estra-1,3,5(10)-triene-3-ol-17β[2′(1′,4′)-oxathianyloxy] and 3-acetate
17α-vinyl-estra-1,3,5(10)-triene-3-ol-17β[2′(1′,4′)-oxathianyloxy] and 3-acetate
17α-vinyl-estra-1,3,5(10)-triene-3-ol-17β[2′(1′,4′)-dioxanyloxy] and 3-acetate
17α-isopropyl-estra-1,3,5(10)-triene-3-ol-17β[2′(1′,4′)-oxathianyloxy] and 3-acetate
17α-chloroethinyl-estra-1,3,5(10)-triene-3-ol-17β[2′(1′, 4′)-dioxanyloxy] and 3-acetate
17α-chloroethinyl-estra-1,3,5(10)-triene-3-ol-17β-[2′ (1′,4′)-oxathianyloxyl] and 3-acetate.

EXAMPLE 14

Estra-1,3,5-(10)-triene-3-benzyloxy-17β-(2′(1′,4)-dioxanyloxy)

To a solution of 2.2 gr. of estradiol-3-benzylether in 150 ml. of anhydrous benzene are added 40 mg. of p-toluenesulphonic acid and 2.8 ml. of p-dioxene. Maintained at room temperature for 38 hr., and neutralized with 1.2 ml. of anhydrous pyridine, the solution is then absorbed on 100 gr. of alkaline alumina oxide (Act. II). After eluation with benzene, 2.75 gr. of product is collected: estra - 1,3,5(10)-triene-3-benzyloxy-17β[2′-(1′, 4′)-dioxanyloxy], a mixture of the two diastero-isomers [α]$_D$=+28° (CHCl$_3$).

EXAMPLE 15

Estra-1,3,5-(10)-triene-3-benzyloxy-17β[2′(1′,4′)-oxathianyloxy]

Proceeding as in the previous example, substituting the p-dioxene with 1,4-oxathiene, it is possible to obtain from 2.1 gr. of estradiol-3-benzylether 2.7 gr. of estra-1,3,5 (10 - triene - 3-benzyloxy-17β[2′-(1′,4′)-oxathianyloxy] [α]$_D$=+32° (CHCl$_3$).

A sample of this product crystallized from acetone repeatedly supplies a sample of estra-1,3,5(10)-triene-3-benzyloxy - 17β[2′(1′,4′) - oxathianyloxy]: M.P. 132–134° C.; [α]$_D$=+66° (CHCl$_3$) (almost pure α-anomer). From the mother liquors on crystallization from petroleum ether a sample of product with a M.P. of 90–93° C.; [α]$_D$=−2° (CHCl$_3$) is obtained (almost pure β-anomer).

EXAMPLE 16

Estra-1,3,5-(10)-triene-3-ol-17β-3-ol-17β[2′-(1′,4′)-dioxanyloxy]

A solution of 2.2 gr. of estra-1,3,5(10)-triene-3-benziloxy-17β-[2′-(1′,4′)-dioxanyloxy] in 25 ml. of ethyl acetate is hydrogenated in the presence of 0.5 gr. of Pd/c at 5% until absorption in 1 equivalent of H.

It is filtered from the catalyst and evaporated to dryness to give 1.65 gr. of estra-1,3,5(10)-triene-3-ol-17β [2′ - (1′,4) - dioxanyloxy][α]$_D$=+40° (CHCl$_3$). This product is dissolved in 25 ml. of ethyl ether and left to crystallize slowly. Two successive runs of product are collected; M.P. 210–212° C.; [α]$_D$=+99° (chloroform) which when crystallized from ethyl ether supplies 0.25 gr. of estra-1,3,5(10) - trieine-3-ol-17β[2′α-(1′,4′)-dioxanyloxy] M.P. 222–222.5° C.; [α]$_D$=+124° CHCl$_3$ (pure α-anomer).

The mother liquors of the successive crystallizations from ethyl ether are evaporated to dryness and on further crystallization from methanol supply 350 mg. of product; M.P. 172–182° C.; [α]$_D$=+3° CHCl$_3$), which, recrystallized from ethanol, supplies 225 mg. of estra-1,3,5(10) - triene-3-ol-17β[2′β-(1′,4′)-dioxanyloxy] with M.P. 177–178° C.; [α]$_D$=−14° (CHCl$_3$) (pure β-anomer).

EXAMPLE 17

Estra-1,3,5(10)-triene-3-ol-17β[2′-(1′,4′)-oxathianyloxy]

To a solution of 2 gr. of estra-1,3,5(10)-triene-3-benziloxy 17β(2′-(1′,4′)-oxathianyloxy) in 90 ml. of n-propanol, refluxed, a total of 4 gr. of Na are added in small portions, under agitation and in a current of N$_2$. Under reduced pressure, maintaining the temperature around 50° C., the excess n-propanol is evaporated. Diluted with water, the solution is filtered through paper. The clear filtrate is acidified with a solution of 10% monosodium phosphate. An abundant precipitate is formed which is filtered to dryness in vacuum. On crystallization from dilute methanol, 1.52 gr. of estra-1,3,5(10)-triene-3-ol-17β-(2′-(1′,4′)oxathianyloxy); [α]$_D$=+32° (CHCl$_3$), is obtained. The fractionated crystallization from ethyl ether and methanol, as described in the preceding example, allows the two pure anomers to separate.

β-anomer M.P. 225–227° C. [α]$_D$=−12° (CHCl$_3$)
α-anomer [α]$_D$=+110° (CHCl$_3$)

EXAMPLE 18

Estra-1,3,5(10)-triene-17β-ol-3(2′α(1′,4′)-oxathianyloxy)

To 250 mg. of estra-1,3,5(10)-triene-17-one-3(2′α-(1′, 4′)oxathianyloxy) dissolved in 2 ml. of methanol are added 150 mg. of NaBH$_4$ in small portions. Kept at room temperature for 4 hr. and then diluted cautiously with water, a crystalline product separates, which after filtration and successive crystallization from ethyl ether supplies 196 mg. of estra-1,3,5(10)-triene-17β-ol-3(2'α-(1',-4')-oxathianyloxy; M.P. 192° C.; [α]_D=+112° (CHCl_3).

EXAMPLE 19

Estra-1,3,5(10)-triene-17β-ol-3(2'β-(1',4')-oxathianyloxy

Working as in Example 18, but starting with 500 mg. of estra-1,3,5(10)-triene-17-one - 3(2'β-(1',4')-oxathianyloxy), crystallization from ethyl acetate gives 410 mg. of estra-1,3,5(10)-triene-17β - ol - 3(2'β-(1',4')-oxathianyloxy); M.P. 218-219° C.; [α]_D=+12° (CHCl_3).

EXAMPLE 20

Estra-1,3,5(10)-triene-3(2'α(1',4')-dioxanyloxy)-17β-ol-17-propionate

To a solution of 250 mg. of estra-1,3,5(10)-triene-3-[2'α(1',4')-dioxanyloxy]-17β-ol in 1 ml. of peridine are added 0.5 ml. of propionic anhydride. The mixture is left to stand overnight at room temperature. Diluted with water, the crystallized product is filtered and recrystallized from hexane to give 265 mg. of estra-1,3,5(10)-triene-3-(2'α(1',4')-dioxanyloxy)-17β-ol-17-propionate; M.P. 111–112° C.; [α]_D=+112° (CHCl_3).

EXAMPLE 21

Estra-1,3,5(10)-triene-17β-ol-3[2'α(1',4')-oxathianyloxy]-17-heptanoate

To a solution of 500 mg. of estra-1,3,5(10)-triene17β-ol-3(2'α(1',4')-oxathianyloxy) in 2 ml. of pyridine is added 1 ml. of heptanoic acid anhydride. The solution is kept for 18 hr. at 40° C. then diluted with water and distilled in a steam current. The residue of the distillation is extracted with benzene. The organic phases are washed with water and dried over sodium sulphate. The solution is concentrated to 3 ml. and absorbed on a column of 20 gr. basic alumina (Act II according to Brockman). It is then eluted with hexane and hexane-benzene. On evaporation of the solvent, the hexane-benzene fractions give 4:1 450 mg. of estra-1,3,5(10)-triene-17β-ol-3(2'α (1',4')-oxathianyloxy) - 17 - heptanoate; [α]_D=+92° (CHCl_3).

EXAMPLE 22

Proceeding as in Examples 20 and 21, according to the circumstances the following were prepared:

estra-1,3,5(10)-triene-17β-ol-3(2'α-(1',4') - dioxanyloxy)
  -17 acetate; M.P. 140–142° C.; [α]_D=+120° (CHCl_3)
17-benzoate [α]_D=+100° (CHCl_3)
17-heptanoate cerous
17-capronate
17-propionylglycolate [α]_D=+101° (CHCl_3)
17-cyclopentyl propionate
estra-1,3,5(10)-triene-17β-ol-3(2'β(1',4')-dioxanyloxy
17-propionate M.P. 90–92° C. [α]_D=40° (CHCl_3)
17-hexanoate
17-heptanoate [α]_D=−32° (CHCl_3)
17-benzoate
17-pentanoate
17-cyclopentylpropionate
17-stearoylglycolate
estra-1,3,5(10)-triene-17β-ol-3(2'α(1',4')-oxathianyloxy
17-acetate M.P. 166–168° C. [α]_D=+96° (CHCl_3)
17-propionate M.P. 140–142° C.
17-valerate
17-hexanoate
17-heptanoate [α]_D=+92° (CHCl_3)
17-cyclopentylpropionate
17-decanoate
estra-1,3,5(10)-triene-17β-ol-3(2'β(1',4')-oxathianyloxy)
17-acetate
17-propionate
17-valerate
17-hexanoate
17-heptanoate
17-decanoate
17-benzoate
17-cyclopentylpropionate

EXAMPLE 23

Estra-1,3,5(10)-triene-3-ol-17β(2'β(1',4')-dioxanyloxy)-3-acetate

To a solution of 120 mg. of estra-1,3,5(10)-triene-3-ol-17β-(2'β(1',4')dioxanyloxy) in 0.2 ml. of pyridine is added 0.1 ml. of acetic anhydride. After a night at room temperature it is diluted with water and the separated product is filtered. After crystallization from hexane, 110 mg. of estra 1,3,5(10)-triene-3-ol-17β-(2'β(1',4')-dioxanyloxy)-3-acetate M.P. 120–122° C. Working in the same way and as in Examples 20 and 21, the following were prepared:

estra-1,3,5(10)-triene-3-ol-17β[2'α(1',4')-dioxanyloxy]
3-acetate
3-propionate
3-valerate
3-hexanoate
3-heptanoate
3-decanoate
3-benzoate M.P. 135–137° C. [α]_D=+94° (CHCl_3)
3-cyclopentylpropionate
estra-1,3,5(10)-triene-3-ol-17β(2'β(1',4')-dioxanyloxy
3-acetate
3-propionate
3-valerate
3-hexanoate
3-heptanoate
3-decanoate
3-benzoate M.P. 140–141° C. [α]_D=−1° (CHCl_3)
3-cyclopentylpropionate
estra-1,3,5(10)-triene-3-ol-17β-(2'β(1',4')-oxathianyloxy)
3-acetate
3-propionate
3-valerate
3-hexanoate
3-heptanoate
3-decanoate
3-benzoate
3-cyclopentylpropionate
estra-1,3,5(10)-triene-3-ol-17β(2'α(1',4')-oxathianyloxy
3-acetate
3-propionate
3-valerate
3-hexanoate
3-heptanoate
3-benzoate
3-propionylglycolate
17α-ethinyl-1,3,5(10)-triene-3-ol-17β(2'α(1',4')-dioxanyloxy)
3-acetate
3-valerate
3-hexanoate
3-heptanoate
17α-chloroethinyl-1,3,5(10)-triene-3-ol-17β(2'α(1',4')-dioxanyloxy)
3-acetate
3-valerate
3-heptanoate

EXAMPLE 24

17α-vinyl-estra-1,3,5(10)-triene-17β-3(2'α(1',4')-dioxanyloxy)

To 500 mg. of 17α-ethinyl-estra-1,3,5(10)-triene-17β-ol-3(2'α(1',4')-dioxanyloxy), dissolved in 10 ml. of anhydrous pyridine, are added 100 mg. of Pd/CaCO_3 at 2%. The solution is hydrogenated at room temperature and pressure until the absorption of 1 molecular equivalent of H. It is then filtered from the catalyst and evaporated to dryness in vacuum. The residue is crystallized from ethyl ether to obtain 420 mg. of 17α-vinyl-estra-1,3,5(10)-triene - 17β - ol - 3(2'α(1',4')-dioxanyloxy) [α]$_D$=+93° (CHCl$_3$).

EXAMPLE 25

17(ethyl-estra-1,3,5(10)-triene-17β-ol-3(2'β(1',4')-dioxanyloxy)

To a solution of 350 mg. of 17α-ethinyl-estra-1,3,5 (10)-triene-17β-ol-3(2'β(1',4')-dioxanyloxy in 5 ml. of dioxane and 15 ml. of ethanol are added 150 mg. of Pd/CaCO$_3$ at 5% and then hydrogenated at room temperature and pressure until absorption of molecular equivalents of hydrogen. It is filtered from the catalyst and evaporated to dryness. The residue is crystallized from ethyl ether to give 312 mg. of 17α-ethyl-estra-1,3,5 (10)-triene-17β-ol-3(2'β(1',4')-dioxanyloxy). Proceeding as in Examples 24 and 25, starting from the corresponding 17α-ethinyl derivatives, the following were prepared:

17α-vinyl-estra-1,3,5(10)-triene-17β-ol-3(2'β(1',4')-dioxanyloxy)
17α-vinyl-estra-1,3,5(10)-triene-17β-ol-3[2'α(1',4') oxathianyloxy]
17α-vinyl-estra-1,3,5(10)-triene-17β-ol-3[2'β(1',4') oxathianyloxy]
17α-ethyl-estra-1,3,5(10)-triene-17β-ol-3(2'α(1',4') dioxanyloxy) [α]$_D$=+94° (CHCl$_3$)
17α-ethyl-estra-1,3,5(10)-triene-17β-ol-3[2'α(1',4') oxathianyloxy]
17α-ethyl-estra-1,3,5(10)-triene-17β-ol-3[2'β(1',4') oxathianyloxy]

EXAMPLE 26

Estra-1,3,5(10)-triene-3-methoxy-17β-(2'-dioxa-(1',4')-nyloxy)

To a solution of 4.4 gr. of 3-methoxy-estra-1,3,5(10)-trien-17β-ol in 40 ml. of anhydrous benzene are added 5 ml. of 1,4-dioxene and 3 drops of POCl$_3$.

The mixture of reaction is kept for 12 hr. at 60° C.; it is then added of 1 ml. of pyridine and successively adsorbed on a column of 75 gr. of basic alumina (Act. 1) and eluted with benzene. On evaporation of the eluate (250 ml.) and subsequent crystallization from aqueous acetone are obtained 3,920 gr. of estra-1,3,5(10)-triene-3-methoxy-17β-(2'-dioxa-(2',4')-nyloxy). M.P.=103–8° C. [α]$_D$=+45° (CHCl$_3$).

EXAMPLE 27

Estra-1,3,5(10)-triene-3-methoxy-17β-(2'β-dioxa-(1',4')-nyloxy)

A solution of 0.98 gr. of estra-1,3,5(10)-trien-3,17β-diol-17β-(2'β-dioxa-(1',4')-nylether), M.P.=175-7° C., [α]$_D$=−14° in 15 ml. of methanol and 12.6 ml. of water containing 1 gr. of KOH is separately added in 1 hr., keeping the temperature about 35° C., of a solution of 5.6 gr. of KOH in 12.6 ml. of H$_2$O and of 7.5 ml. of (CH$_3$)$_2$SO$_4$. When the addition of such compounds is finished, the mixture of reaction is kept under stirring for another hour at 33–5° C. and successively diluted with water.

The precipitate is filtered, dissolved in ethyl ether, extracted with Claisens alkalies to remove eventual traces of free phenol and then the ethereal phases are washed with water until neutralized, dried, dehydrated over Na$_2$SO$_4$ and evaporated to dryness. On crystallization from methanol 0.74 gr. of estra-1,3,5(10)-triene-3-methoxy-17β-(2'β - dioxa - 1',4' - nyloxy) are obtained. M.P.=133–4° C., [α]$_D$=−16° (CHCl$_3$).

EXAMPLE 28

Estra-1,3,5(10)-triene-3-methoxy-17β-(2'α-dioxa-(1',4')-nyloxy

Working as in Example 27 and starting with 1.2 gr. of estra - 1,3,5(10) - triene - 3,17β - diol-17β-(2'α-dioxa-(1',4') - nylether), M.P.=212–4° C. [α]$_D$=+110° (CHCl$_3$) obtained, after crystallization from methanol, 0.9 gr. of estra-1,3,5(10)-triene-3-methoxy-17β-(2'α-dioxa-(1',4')-nyloxy). M.P.=119–121° C., [α]=+111° (CHCl$_3$).

Proceeding as in Examples 26, 27 and 28, the following compounds were prepared.

estra-1,3,5(10)-triene - 3 - methoxy-17β(2'-oxathia-1',4'-nyloxy) (mixture of the two anomers α and β) and the single anomers:
  estra-1,3,5(10)-triene-3-methoxy-17β(2'α-oxathia-1',4'-nyloxy)
  estra-1,3,5(10)-triene-3-methoxy-17β(2'β-oxathia-1',4'-nyloxy)

What is claimed is:
1. A compound of the formula

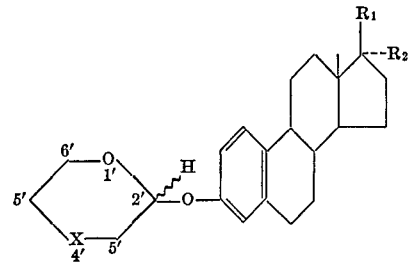

in which,
X is a member selected from the group consisting of O and S;
R$_1$ is a member selected from the group consisting of H, OH, alkoxy, lower alkyl and acyloxy;
R$_2$ is a member selected from the group consisting of H, OH, lower alkyl, allyl,

CH$_2$—C(CH$_3$)=CH$_2$—CH$_2$—CH=CH—CH$_3$C$_6$H$_5$

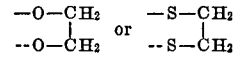, CH=CH—R$_a$ and —C=C—R$_b$ in which R$_a$ is selected from the group consisting of H and lower alkyl and
R$_b$ is selected from the group consisting of H, OCH$_3$, OC$_2$H$_5$, CF$_3$, CCl$_3$, halogen, —C≡CH and —C≡C—CH$_3$;
where R$_1$ and R$_2$ together are a keto group, $$\begin{array}{cc} -O-CH_2 & -S-CH_2 \\ | & | \\ -O-CH_2 & -S-CH_2 \end{array} \quad \text{or}$$

2. A compound of the formula

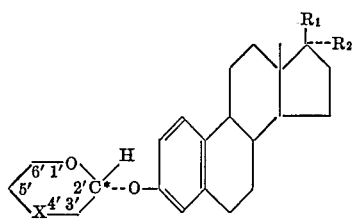

in which,
X is a member selected from the group consisting of O and S;
R$_1$ is a member selected from the group consisting of H, OH, alkoxy, lower alkyl and acyloxy;
R$_2$ is a member selected from the group consisting of H, OH, lower alkyl, allyl,

CH$_2$—C(CH$_3$)=CH$_2$, —CH$_2$—CH=CH—CH$_3$, C$_6$H$_5$

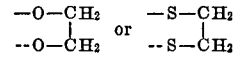, —CH=CH—R$_a$ and —C≡C—R$_b$ in which $R_a$ is selected from the group consisting of H and lower alkyl and $R_b$ is selected from the group consisting of H, $OCH_3$, $OC_2H_5$, $CF_3$, $CCl_3$, halogen, $C\equiv CH$ and $-C\equiv C-CH_3$;

where $R_1$ and $R_2$ together are a keto group,

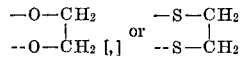

in which the stearic configuration of the substituents to asymmetric carbon, $C^*2'$, of the acetalic ether is such that the resulting compound is, of the two diasteroisomers, that which corresponds to the dextrorotatory power at sodium light; a compound which, for graphic convenience, is represented with the $C^*$—H bond axial and the acetalic bond towards the steroid equatorial; and which is defined as α-anomer.

3. A compound of the formula

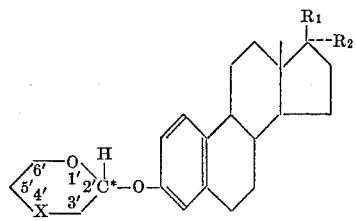

in which,

X is a member selected from the group consisting of O and S;

$R_1$ is a member selected from the group consisting of H, alkoxy, lower alkyl and acyloxy;

$R_2$ is a member selected from the group consisting of H, OH, lower alkyl, allyl,

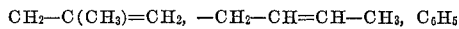

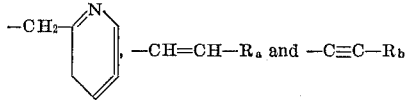

in which $R_a$ is
selected from the group consisting of H and lower alkyl and $R_b$ is selected from the group consisting of H, $OCH_3$, $OC_2H_5$, $CF_3$, $CCl_3$, halogen, $-C\equiv CH$ and $-C\equiv C-CH_3$;

where $R_1$ and $R_2$ together are a keto group,

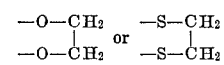

in which the steric configuration of the substituents to asymmetric carbon, $C^*2'$, of the acetalic ether is such that the resulting compound is that which corresponds to the most laevorotatory power at sodium light; a compound which, for graphic convenience, is represented with the $C^*$—H bond equatorial and the acetalic bond towards the steroid axial; and which is defined as β-anomer.

4. A compound of the formula

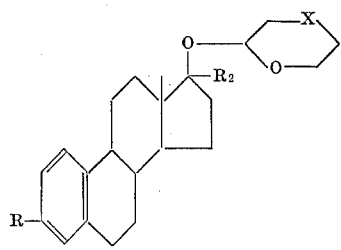

in which,

X is a member selected from the group consisting of O and S;

R is a member selected from the group consisting of H, OH, alkoxy, lower alkyl, acyloxy, $C_6H_5-CH_2O-$ and $C_6H_5-CH_2O-CO-O$;

$R_2$ is a member selected from the group consisting of H, lower alkyl, allyl,

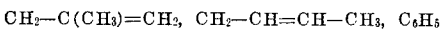

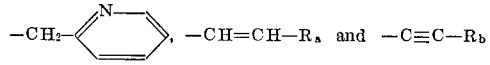

in which $R_a$ is selected from the group consisting of H and lower alkyl and $R_b$ is selected from the group consisting of H, $OCH_3$, $OC_2H_5$, $CF_3$, $CCl_3$, halogen, $-C\equiv CH$ and $-C\equiv C-CH_3$.

5. A compound of the following formula

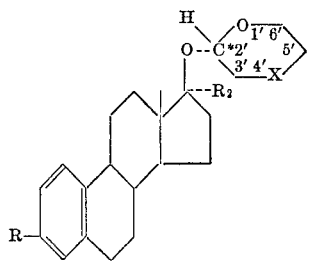

in which,

X is a member selected from the group consisting of O and S;

R is a member selected from the group consisting of H, OH, alkoxy lower alkyl, acyloxy, $C_6H_5-CH_2O-$ and $C_6H_5-CH_2O-CO-O$;

$R_2$ is a member selected from the group consisting of H, lower alkyl, allyl,

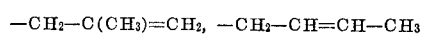

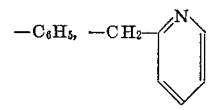

in which $R_a$ is selected from the group consisting of H and lower alkyl and $R_b$ is selected from the group consisting of H, $OCH_3$, $OC_2H_5$, $CF_3$, $CCl_3$, halogen, $-C\equiv CH$ and $-C\equiv C-CH_3$;

in which the steric configuration of the substituents to asymmetric carbon, $C^*2'$, of the acetalic ether is such that the resulting compound is, of the two diasteroisomers, that which corresponds to the most dextrorotatory power at sodium light; a compound that, for graphic convenience, is described with the $C^*$—H bond axial and the acetalic bond towards the steroid equatorial, and which is defined, as α-anomer.

6. A compound of the following formula

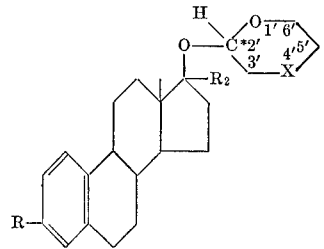

23 in which,
X is a member selected from the group consisting of O and S;
R is a member selected from the group consisting of H, OH, alkoxy, lower alkyl, acyloxy,
$C_6H_5$—$CH_2O$—
and $C_6H_5CH_2O$—CO—O;
$R_2$ is a member selected from the group consisting of H, lower alkyl, allyl, $CH_2$—$C(CH_3)$=$CH_2$, $CH_2$—$CH$=$CH$—$CH_3$, $C_6H_5$

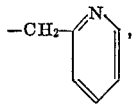, —CH=CH—$R_a$ and —C≡C—$R_b$ in which
$R_a$ is selected from the group consisting of H and lower alkyl and
$R_b$ is selected from the group consisting of H, $OCH_3$, $OC_2H_5$, $CF_3$, $CCl_3$, halogen, —C≡CH and —C≡C—$CH_3$;
in which the steric configuration of the substituents to asymmetric carbon, C*2′, of the acetalic ether is such that the resulting compound is, of the two diasteroisomers, that which corresponds to the most laevorotatory power at sodium light; a compound that for graphic convenience is represented with the C*H bond equatorial and the acetalic bond towards the steroid axial; and which is defined as α-anomer.

7. A compound of the following formula

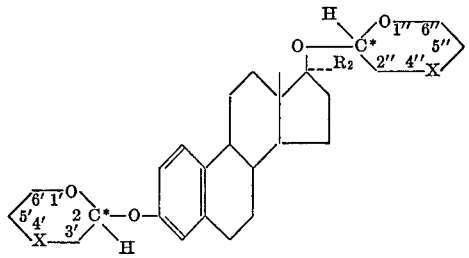

in which,
X′ and X″ are selected from the group consisting of O and S in such a manner that X′=X″=O and X′=X″=S
$R_2$ is a member selected from the group consisting of H, alkoxy, lower alkyl, allyl, $CH_2$—$C(CH_3)$=$CH_2$, $CH_2$—$CH$=$CH$—$CH_3$, $C_6H_5$

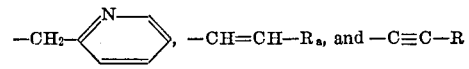, —CH=CH—$R_a$, and —C≡C—R in which
$R_a$ is selected from the group consisting of H and lower alkyl and
$R_b$ is selected from the group consisting of H, lower alkyl, $OCH_3$, $OC_2H_5$, $CF_3$, $CCl_3$, halogen, —C≡CH and —C≡C—$CH_3$;
in which the configuration of the 2 atoms of C semiacetalic C*2′ and C*2″ is not strictly defined.

8. A compound of claim 1 in which the acyloxy grouping contains up to 18 carbon atoms.

9. A compound of claim 4 in which the acyloxy group contains up to 18 carbon atoms.

10. A compound of claim 1 where the acyloxy group is selected from the group consisting of acetate, propionate, valerate, hexanoate, heptanoate, benzoate, trimethylacetate, phenoxy-acetate, cyclopentyl propionate, aminoacetate, α-chloro-acetate, β-chloro-propionate, morpholine-acetate, stearoylglycolate and propionylglycolate.

11. A compound of claim 4 where the acyloxy group is selected from the group consisting of acetate, propionate, valerate, hexanoate, heptanoate, benzoate, trimethyl-acetate, phenoxy-acetate, cyclopentyl propionate, amino-acetate, α-chloro-acetate, β-chloro-propionate, morpholine-acetate, stearoylglycolate, propionylglycolate.

24

12. A compound of claim 5 where the acyloxy group is selected from the group consisting of acetate, propionate, valerate, hexanoate, heptanoate, benzoate, trimethyl-acetate, phenoxy-acetate, cyclopentyl propionate, amino-acetate, α-chloro-acetate, β-chloro-propionate, morpholine-acetate, stearoylglycolate, propionylglycolate.

13. A compound of claim 6 where the acyloxy group is selected from the group consisting of acetate, propionate, valerate, hexanoate, heptanoate, benzoate, trimethyl-acetate, phenoxy-acetate, cyclopentyl propionate, amino-acetate, α-chloro-acetate, β-chloro-propionate, morpholine-acetate, stearoylglycolate, propionylglycolate.

14. Estra - 1,3,5(10) - triene - 17 - one-3[2′-(1′,4′)-dioxanyloxy], α-anomer, β-anomer and mixture of the anomers.

15. Estra - 1,3,5(10) - triene - 17 - one-3[2′-(1′,4′)-oxathianyloxy], α-anomer, β-anomer and mixtures of the anomers.

16. Estra - 1,3,5(10) - triene - 3 - ol-17β-[2′-(1′,4′)-dioxanyloxy], α-anomer, β-anomer and mixture of the anomers.

17. Estra - 1,3,5(10) - triene-3-ol-17β-[2′-(1′,4′)-oxathianyloxy], α-anomer, β-anomer and mixture of the anomers.

18. Estra - 1,3,5(10) - triene-3,17β-[3(2′),17β(2″)-bis-(1′,4′),(1″,4″)-dioxanyloxy].

19. Estra - 1,3,5(10) - triene-3,17β-[3(2′),17β(2″)-bis-(1′,4′),(1″,4″)-oxathianyloxy].

20. 17α - ethinyl - estra-1,3,5(10)-triene-17β-ol-3-[2′-(1′,4′)-dioxanyloxy], α-anomer, β-anomer, and mixture of the anomers.

21. 17α - ethinyl - estra-1,3,5(10)-triene-17β-ol-3[2′-(1′,4′)-oxathianyloxy], α-anomer, β-anomer, mixture of the anomers.

22. A 3-acetate of a 17β-2′(1′,4′)dioxanyl ether of estradiol.

23. A 3-propionate of a 17β-2′(1′,4′)dioxanyl ether of estradiol.

24. A 3-benzoate of a 17β-2′(1′,4′)dioxanyl ether of estradiol.

25. A 3-hexanoate of a 17β-2′(1′,4′)dioxanyl ether of estradiol.

26. A 3-heptanoate of a 17β-2′(1′,4′)dioxanyl ether of estradiol.

27. A 3-acetate of a 17β-2′(1′,4′)oxathianyl ether of estradiol.

28. A 3-propionate of a 17β-2′(1′,4′)oxathianyl ether of estradiol.

29. A 3-benzoate of a 17β-2′(1′,4′)oxathianyl ether of estradiol.

30. A 3-hexanoate of a 17β-2′(1′,4′)oxathianyl ether of estradiol.

31. A 3-heptanoate of a 17β-2′(1′,4′)oxathianyl ether of estradiol.

32. A 17-hexanoate of a 3-dioxanyl ether of estradiol.

33. A 17-hexanoate of a 3-2′(1′4′)oxathianyl ether of estradiol.

34. 3 - benzyloxy - estra-1,3,5(10)-triene-17β-[2′(1′,4′)-dioxanyloxy], α-anomer, β-anomer, mixture of the anomers.

35. 3 - benzyloxy-estra-1,3,5(10)-triene-17β-[2′(1′,4′)-oxathianyloxy], α-anomer, β-anomer, mixture of the anomers.

36. 17α - ethinyl - estra-1,3,5(10)-trien-3,17β-diol-17 [2′-(1′,4′)-dioxanyloxy].

37. 17α - ethinyl - estra-1,3,5(10)-trien-3,17β-diol-17 [2′(1′,4′)-oxathianyloxy].

38. 17α - ethinyl - estra-1,3,5(10)-triene-3,17β-[3(2′), 17β-(2″)-bis-(1′,4′),(1″,4″)-dioaxanyloxy].

39. 17α - ethinyl - estra-1,3,5(10)-triene-3,17β-[3(2′), 17β-(2″)-bis-(1′,4′),(1″,4″)-oxathianyloxy].

40. Estra - 1,3,5(10) - trien-17β-ol-3[2'-(1',4')-dioxanyloxy], α-anomer, β-anomer, mixture of the anomers.

41. Estra - 1,3,5(10) - trien-17β-ol-3[2'(1',4')-oxathianyloxy], α-anomer, β-anomer, mixture of the anomers.

42. Estra - 1,3,5(10) - triene-3-methoxy-17β(2'-dioxa(1',4')-nyloxy), α-anomer, β-anomer, mixture of the anomers.

43. Estra - 1,3,5(10) - triene-3-methoxy-17β-(2'-oxathia(1',4')-nyloxy), α-anomer, β-anomer, mixture of the anomers.

References Cited

FOREIGN PATENTS 1,505,056  10/1967  France.

LEWIS GOTTS, Primary Examiner

E. G. LOVE, Assistant Examiner

U.S. Cl. X.R.

424—241